United States Patent
Oppenländer et al.

(10) Patent No.: US 6,548,461 B1
(45) Date of Patent: Apr. 15, 2003

(54) POLYALKENE ALCOHOL POLYETHERAMINES AND THEIR USE IN FUELS AND LUBRICANTS

(75) Inventors: Knut Oppenländer, Ludwigshafen (DE); Wolfgang Günther, Mettenheim (DE); Dietmar Posselt, Heidelberg (DE); Klemens Massonne, Westheim (DE); Hans Peter Rath, Grünstadt (DE)

(73) Assignee: Basf Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/958,546
(22) PCT Filed: Mar. 28, 2000
(86) PCT No.: PCT/EP00/02714
§ 371 (c)(1), (2), (4) Date: Oct. 11, 2001
(87) PCT Pub. No.: WO00/61708
PCT Pub. Date: Oct. 19, 2000

(30) Foreign Application Priority Data

Apr. 13, 1999 (DE) .......................... 199 16 512

(51) Int. Cl.$^7$ ................... C10M 133/04; C10M 133/38; C10M 133/58; C10L 1/22; C07C 209/16
(52) U.S. Cl. .................... 508/559; 44/434; 508/562
(58) Field of Search .................... 44/434; 508/559, 508/562

(56) References Cited

U.S. PATENT DOCUMENTS

| | | | |
|---|---|---|---|
| 4,832,702 A | | 5/1989 | Kummer |
| 5,089,029 A | * | 2/1992 | Hashimoto et al. ............ 44/432 |
| 5,094,667 A | * | 3/1992 | Schilowitz et al. ............ 44/418 |
| 5,112,364 A | * | 5/1992 | Rath et al. .................... 44/418 |
| 5,264,006 A | * | 11/1993 | Schilowitz et al. ............ 44/434 |
| 5,530,127 A | | 6/1996 | Reif |
| 6,193,767 B1 | * | 2/2001 | Arters et al. .................. 44/412 |
| 6,217,624 B1 | * | 4/2001 | Morris et al. ................. 44/434 |
| 6,267,791 B1 | * | 7/2001 | Thomas et al. ............... 44/412 |

FOREIGN PATENT DOCUMENTS

| | | |
|---|---|---|
| EP | 244 616 | 11/1987 |
| EP | 310 875 | 4/1989 |
| EP | 440 248 | 8/1991 |
| EP | 448365 | 9/1991 |
| EP | 696 572 | 2/1996 |
| GB | 310 875 | 7/1930 |
| WO | 00/50543 | 8/2000 |

OTHER PUBLICATIONS

Additive fur Kraftstoffe, Rossenbeck, 223–229.

* cited by examiner

Primary Examiner—Jacqueline V. Howard
(74) Attorney, Agent, or Firm—Keil & Weinkauf

(57) ABSTRACT

The invention relates to polyalkene alcohol polyetheramines of formula $R^1—(CH_2)_n—O—A)_m—NR^2R^3$, wherein $R^1$ represents a polyalkene radical derived from $C_2$- to $C_{30}$-alkenes with a number average molecular weight of 300 to 5000, $R^2$ and $R^3$ each mean, independently of each other, hydrogen or organic radicals with a total of 400 carbon atoms. A denotes alkylene groups with 2 to 8 C atoms, m is a number from 1 to 200 and n denotes the number 0 or 1. The inventive polyalkene alcohol polyetheramines are suitable for use as carrier oils, detergents and dispersing agents in fuel and lubricant compositions.

9 Claims, No Drawings

POLYALKENE ALCOHOL POLYETHERAMINES AND THEIR USE IN FUELS AND LUBRICANTS

The present invention relates to special polyalkene alcohol polyetheramines, their use as carrier oils, detergents or dispersants in fuel and lubricant compositions and fuel and lubricant additive concentrates and fuel and lubricant compositions themselves which contain these polyalkene alcohol polyetheramines.

Carburetors and intake systems of gasoline engines as well as injection systems for fuel metering are increasingly contaminated by impurities which are caused by dust particles from the air, uncombusted hydrocarbon residues from the combustion chamber and the crank case vent gases passed into the carburetor.

These residues shift the air/fuel ratio during idling and in the lower part-load range so that the mixture becomes leaner and the combustion more incomplete and in turn the proportions of uncombusted or partially combusted hydrocarbons in the exhaust gas become greater and the gasoline consumption increases.

It is known that, to avoid these disadvantages, fuel additives are used for keeping valves and carburetors or injection systems of gasoline engines clean (cf. for example: M. Rossenbeck in Katalysatoren, Tenside, Mineralöladditive, Editors J. Falbe and U. Hasserodt, page 223, G. Thieme Verlag, Stuttgart 1978).

Frequently used fuel additives of this type are polyisobuteneamines, as described, for example, in EP-A 244 616, or polyetheramines, as described, for example, in EP-A 310 875.

The class consisting of the polyisobuteneamines generally has a good effect but—depending on the chain length of a poly(iso)butene moiety in the molecule, the engine type and the additive concentration used—they often cause sticking of the valves, which may lead to total failure of the engine. The sticking of the valve is understood here as meaning complete loss of compression in one or more cylinders of the internal combustion engine if—owing to polymer deposits on the valve shaft—spring forces are no longer sufficient to close the valves properly.

Although polyetheramines generally also exhibit good activity, their usability is subject to certain restrictions. Owing to the polar polyether chain, the solubility in the nonpolar fuel may be reduced. For compensation, it is then necessary either to use long-chain alkanols as initiator molecules for the preparation of the polyetheramines, which are industrially available only to a limited extent, or it is necessary to use long-chain epoxides such as butylene oxides, pentene oxides or cyclohexene oxide, to synthesize the polyether chain, which entails substantially higher costs.

It is an object of the present invention to provide mineral oil additives, in particular detergents, for lubricant compositions and in particular fuel compositions, which no longer have the prior art problems described.

We have found that this object is achieved by polyetheralkene alcohol polyetheramines of the formula I

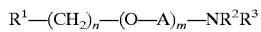

$$R^1-(CH_2)_n-(O-A)_m-NR^2R^3 \quad (I)$$

where $R^1$ is a polyalkene radical derived from $C_2$- to $C_{30}$-alkenes and having a number average molecular weight of from 300 to 5000, $R^2$ and $R^3$ may be identical or different and are hydrogen, aliphatic or aromatic hydrocarbon radicals, primary or secondary, aromatic or aliphatic aminoalkylene radicals or polyaminoalkylene radicals, polyoxyalkylene radicals, heteroaryl or heterocyclyl radicals or, together with the nitrogen atom to which they are bonded, form a ring in which further heteroatoms may be present, the maximum number of carbon atoms in $R^2$ and $R^3$ together being 400, A is an alkylene group of 2 to 8 carbon atoms, m is from 1 to 200 and n is 0 or 1.

Suitable radicals $R^1$ are straight-chain or branched hydrocarbon groups which are derived from $C_2$- to $C_{30}$-alkenes, in particular from $C_3$- to $C_{12}$-alkenes, especially from $C_3$- to $C_6$-alkenes. Typical alkenes are ethene, propene, butenes, pentenes, hexenes, heptenes, octenes, nonenes, decenes, undecenes and dodecenes. Of particular interest are propene, n-butene and isobutene. The polyalkene on which the hydrocarbon radical $R^1$ is based is obtainable by oligomerization or polymerization of these alkenes, the oligomerization or polymerization being carried out as a rule (for example by cationic or coordination oligomerization or polymerization) so that the chain termination leads to a double bond which can be further functionalized to give the corresponding polyalkene alcohol.

$R^1$ is preferably a polybutyl or polyisobutyl radical derived from isobutene and up to 20% by weight of n-butene and having a number average molecular weight ($M_N$) of from 300 to 2500. $R^1$ is particularly preferably a polybutyl or polyisobutyl radical having a number average molecular weight of from 350 to 1500, in particular from 400 to 850, especially from 450 to 700. Preferably, $R^1$ is also composed of isobutene units alone.

$R^1$ may preferably be based on highly reactive polyisobutene (having double bonds permanently in the α-position) which—as described in EP-A 277 345—can be converted into the corresponding alcohol $R^1$—$CH_2$—OH (n=1) by hydroformylation. Where n=0, polybutenes or polyisobutenes having double bonds which are predominantly further toward the interior of the polymer chain (for example in the β- and γ-position) are usually used as starting materials in the preparation of corresponding polybutene alcohols or polyisobutene alcohols; these are then usually converted into the poly(iso)butene alcohols either by ozonolysis and subsequent reduction or by epoxidation and subsequent reduction or by hydroboration and subsequent hydrolysis or by halogenation with chlorine or bromine and subsequent alkaline hydrolysis.

The maximum number of carbon atoms in $R^2$ and $R^3$ together is preferably 200, in particular 100, especially 30. When nitrogen atoms are present in $R^2$ and $R^3$, their maximum number together is preferably 20, in particular 10, especially 5. When oxygen atoms are present in $R^2$ and $R^3$, their maximum number together is 60, in particular 20, especially 10.

In a preferred embodiment, $R^2$ and $R^3$ are identical or different and are each hydrogen, alkyl, aryl, hydroxyalkyl, an aminoalkylene radical of the formula III

$$-R^4-NR^5R^6 \quad (III)$$

where $R^4$ is an alkylene radical and $R^5$ and $R^6$, which are identical or different, are each hydrogen, alkyl, aryl, hydroxyalkyl or a polybutene or polyisobutene radical, a polyaminoalkyl radical of the formula IV

$$[-R^4-NR^5]_pR^6 \quad (IV)$$

where the radicals $R^4$ and the radicals $R^5$ are each identical or different, $R^4$, $R^5$ and $R^6$ have the abovementioned mean ings and p is from 2 to 8, or a polyoxyalkylene radical of the formula V $$[-R^4-O]_q-X \quad (V)$$

where the radicals $R^4$ are identical or different and have the above meanings, X is alkyl or H and q is from 1 to 30, or $R^2$ and $R^3$, together with the nitrogen atom to which they are bonded, form a morpholinyl, pyridyl, piperidyl, pyrrolyl, pyrimidinyl, pyrrolinyl, pyrrolidinyl, pyrazinyl or pyridazinyl radical.

In a particularly preferred embodiment, $R^2$ and $R^3$ are identical or different and are each hydrogen, $C_1$–$C_{10}$-alkyl, phenyl, naphthyl, $C_1$–$C_{10}$-hydroxyalkyl, an aminoalkylene radical of the formula III $$-R^4-NR^5R^6 \quad (III)$$

where $R^4$ is a $C_2$–$C_{10}$-alkylene radical and $R^5$ and $R^6$, which are identical or different, are each hydrogen, $C_1$–$C_{10}$-alkyl, phenyl, naphthyl, $C_1$–$C_{10}$-hydroxyalkyl or a polybutene or polyisobutene radical, each of 20 to 398, especially 30 to 180, carbon atoms, a polyaminoalkylene radical of the formula IV $$[-R^4-NR^5]_pR^6 \quad (IV)$$

where the radicals $R^4$ and the radicals $R^5$ are each identical or different, $R^4$, $R^5$ and $R^6$ have the abovementioned meanings and p is from 2 to 8, or a polyoxyalkylene radical of the formula VI $$[-R^4-O]_q-H \quad (VI)$$

where the radicals $R^4$ are identical or different and have the above meanings and q is from 1 to 30 or $R^2$ and $R^3$, together with the nitrogen atom to which they are bonded, form a morpholinyl radical.

In a further particularly preferred embodiment, in the novel polyalkene alcohol polyetheramines I, $R^2$ is hydrogen and $R^3$ is likewise hydrogen or alkyl having a total of 2 to 8 carbon atoms which also contains from 1 to 4 primary, secondary and/or tertiary nitrogen atoms.

Suitable individual radicals $R^2$ and $R^3$ are, for example, methyl, ethyl, n-propyl, isopropyl, n-butyl, isobutyl, sec-butyl, tert-butyl, n-pentyl, isopentyl, sec-pentyl, tert-pentyl, neopentyl, n-hexyl, n-heptyl, n-octyl, 2-ethylhexyl, n-nonyl, isononyl, n-decyl, n-undecyl, isoundecyl, n-dodecyl, n-tridecyl, isotridecyl, n-tetradecyl, n-hexadecyl, n-octadecyl, n-eicosyl, cyclopentyl, cyclohexyl and phenyl. Typical nitrogen-containing radicals $R^2$ and $R^3$ are the corresponding radicals of the polyamines dimethylaminopropylamine, 1,2-ethylenediamine, diethylenetriamine, triethylenetetramine and tetraethylenepentamine, the parent polyalkene alcohol polyalkoxylate of the formula $R^1-(CH_2)_n-(O-A)_m-OH$ being converted into the polyalkene alcohol polyetheramine I via one of the primary amine functions of these polyamines. Hydroxyl-containing polyamines which are likewise bonded to the parent polyalkene alcohol polyalkoxylate via a primary amine function, especially compounds of the formula $[-CH_2-CH_2-NH]_r-CH_2-CH_2-OH$, where r is from 1 to 7, in particular 1, 2 or 3, are also suitable here. Typical oxygen-containing radicals $R^2$ and $R^3$ are compounds of the formula $[-CH_2-CH_2-O]_s-CH_2-OH$, where s is from 0 to 30, in particular from 1 to 15.

The degree of alkoxylation m depends on the molar mass of the polyalkene alcohol and is preferably from 5 to 100, in particular from 10 to 45, especially from 20 to 35, alkylene oxide units.

The alkylene group A is preferably derived from corresponding alkylene oxides, such as ethylene oxide, propylene oxide, 1,2-butylene oxide and cis- or trans-2,3-butylene oxide. However, it may also be 1,3-propylene, 1,4-butylene, 1,6-hexylene or 1,8-octylene. A may likewise be a mixture of different members of said groups. A is particularly preferably 1,2-propylene, 1,2-butylene or a mixture thereof.

In a preferred embodiment, the novel polyalkene alcohol polyetheramines I are derived from polyalkene alcohol polyalkoxylates of the formula II $$R^1-(CH_2)_n-(O-A)_m-OH \quad (II)$$

where $R^1$, A, m and n have the abovementioned meanings, with the proviso that the oxygen in the oxyalkylate radical $A-(O-A)_{m-1}-OH$ accounts for at least 16.5, in particular 17.5, especially 18.5, % by weight of the number average molecular weight of the total molecule of the compounds II.

In a further preferred embodiment, the molar mass of the oxyalkylate radical $-A-(O-A)_{m-1}-OH$ in the polyalkene alcohol polyalkoxylate II is greater than the molar mass of the parent polyalkene alcohol $R-(CH_2)_n-OH$. The molar mass of the oxyalkylate radical $-A-(O-A)_{m-1}-OH$ in the polyalkene alcohol polyalkoxylate II is in particular from 1.5 to 5, especially from 2 to 4, times the molar mass of the parent polyalkene alcohol $R-(CH_2)_n-OH$. The molar mass calculations are based on the number average molecular weight.

The novel polyalkene alcohol polyetheramines I and the parent polyalkene alcohol polyalkoxylates II can be prepared by conventional methods. The polyalkene alcohol polyalkoxylates II are obtained, for example, by reacting the parent polyalkene alcohols $R^1-(CH_2)_n-OH$ with the corresponding amount of alkylene oxide in the presence of suitable catalysts, such as potassium hydroxide, preferably in an amount of from 0.01 to 1, in particular from 0.05 to 0.5, % by weight, based on the amount of the expected reaction product, in the case of potassium hydroxide. Typical reaction temperatures are from 70 to 200° C., in particular from 100 to 160° C. The pressure is usually from 3 to 30 bar. The reaction product can be worked up in a conventional manner by expelling volatile components in gaseous form under reduced pressure and, if required, by filtration.

The polyalkene alcohol polyetheramines I are prepared as a rule from the compounds II by a reductive amination with ammonia, monoamines or polyamines by conventional continuous or batchwise processes using hydrogenation and amination catalysts usual for this purpose, for example those which contain catalytically active components based on the elements Ni, Co, Cu, Fe, Pd, Pt, Ru, Rh, Re, Al, Si, Ti, Zr, Nb, Mg, Zn, Ag, Au, Os, Ir, Cr, Mo, W or combinations of these elements with one another, in conventional amounts. Typical reaction conditions are temperatures of from about 80° C. to 300° C. and pressures of up to about 600 bar.

The novel polyalkene alcohol polyetheramines I are very useful as carrier oils, dispersants and in particular as detergents in lubricant compositions and in particular fuel compositions, especially gasoline fuel compositions.

Here, the compounds I can also advantageously be used together with other conventional detergents. Examples of such conventional detergents are:

a) Polyisobuteneamines which are obtainable according to EP-A 244 616 by hydroformylation of highly reactive polyisobutene and subsequent reductive amination with ammonia, monoamines or polyamines, such as dimethyleneaminopropylamine, ethylenediamine, diethylenetriamine, triethylenetetramine or tetraethylenepentamine, b) Poly(iso)buteneamines which are obtainable by chlorination of polybutenes or polyisobutenes having double bonds predominantly in the β- and γ-position and subsequent amination with ammonia, monoamines or the abovementioned polyamines, c) Poly(iso)buteneamines which are obtainable by oxidation of double bonds in poly(iso)butenes with air or ozone to give carbonyl or carboxyl compounds and subsequent amination under reducing (hydrogenating) conditions, d) Polyisobuteneamines which are obtainable according to DE-A 196 20 262 from polyisobutene epoxides by reaction with amines and subsequent dehydration and reduction of the aminoalcohols, e) Polyisobuteneamines which may contain hydroxyl group and are obtainable according to WO-A 97/03946 by reaction of polyisobutenes having an average degree of polymerization P of from 5 to 100 with oxides of nitrogen or mixtures of oxides of nitrogen and oxygen and subsequent hydrogenation of these reaction products, f) Hydroxyl-containing polyisobuteneamines which are obtainable according to EP-A 476 485 by reaction of polyisobutene epoxides with ammonia, monoamines or the abovementioned polyamines, g) Polyetheramines which are obtainable by reaction of $C_2$- to $C_{30}$-alkanols, $C_6$- to $C_{30}$-alkanediols, mono- or di-$C_2$- to $C_{30}$-alkylamines, $C_1$- to $C_{30}$-alkylcyclohexanols or $C_1$- to $C_{30}$-alkylphenols with from 1 to 30 mol of ethylene oxide and/or propylene oxide and/or butylene oxide per hydroxyl or amino group and subsequent reductive amination with ammonia, monoamines or the abovementioned polyamines, polyetheramines having a carbamate structure may also be used, h) "Polyisobutene Mannich bases" which are obtainable according to EP-A 831 141 by reaction of polyisobutene-substituted phenols with aldehydes and monoamines or the abovementioned polyamines.

Here, the compounds I can advantageously also be used together with further conventional dispersants, such as imides, amides, esters and ammonium and alkali metal salts of polyisobutene succinic anhydrides, which are used in particular in lubricating oils, but also as detergents in fuel compositions.

Gasoline fuel additives having an action which inhibits valve seat wear may be used as further gasoline fuel additives, together with the compounds I; for example, additives containing carboxyl groups or their alkali metal or alkaline earth metal salts, such as copolymers of $C_2$–$C_{40}$-olefins with maleic anhydride, having a total molar mass of from 500 to 20000, some or all of whose carboxyl groups have been reacted to give the alkali metal or alkaline earth metal salts and the remainder of the carboxyl groups have been reacted with alcohols or amines, as described in EP-A 307 815, or additives containing sulfo groups or their alkali metal or alkaline earth metal salts, for example alkali metal or alkaline earth metal salts of alkyl sulfosuccinates, as described in EP-A 639 632, are of interest here. Such gasoline fuel additives which inhibit valve seat wear can advantageously also be used in combination with conventional fuel detergents, such as poly(iso)buteneamines or polyetheramines, as described in WO-A 87/01126.

The present invention also relates to fuel and lubricant additive concentrates which contain the novel polyalkene alcohol polyetheramines I in amounts of from 0.1 to 80, in particular from 0.5 to 60, % by weight, based on the total amount of the concentrates. These concentrates usually also contain further conventional components and assistants.

Further conventional components and assistants are corrosion inhibitors, for example based on ammonium salts of organic carboxylic acids, which ammonium salts tend to form films, or on heterocyclic aromatics in the case of nonferrous corrosion rotection, antioxidants or stabilizers, for example based on amines, such as p-phenylenediamine, dicyclohexylamine or derivatives thereof, or on phenols, such as 2,4-di-tert-butylphenol or 3,5-di-tert-butyl-4-hydroxyphenylpropionic acid, demulsifiers, antistatic agents, metallocenes, such as ferrocene or methylcyclopentadienylmanganesetricarbonyl, lubricity additives, such as specific fatty acids, alkenyl succinic esters, bis(hydroxyalkyl)-fatty amines, hydroxyacetamides or castor oil and markers. Sometimes amines are also added for reducing the pH of the fuel.

In addition to the detergent and dispersant function, the compounds I have as a rule a carrier oil function, in particular in fuels. However, other conventional carrier oils are also suitable as further conventional components and additives for the novel fuel and lubricant additive concentrates. Examples of these are mineral carrier oils (base oils), in particular those of viscosity grade "Solvent Neutral (SN) 500 to 2000", synthetic carrier oils based on olefin polymers having $M_N$=400 to 1800, especially based on polybutene or polyisobutene (hydrogenated or nonhydrogenated), and on polyalphaolefins or internal polyolefins and synthetic carrier oils based on alkoxylated long-chain alcohols or phenols.

The present invention furthermore relates to fuel and lubricant compositions, in particular fuel compositions, especially gasoline fuel compositions, which contain the novel polyalkene alcohol polyetheramines I in effective amounts. Effective amounts are to be understood as a rule as meaning from 10 to 5000, in particular from 50 to 2000, ppm by weight in the case of fuel compositions and from 0.1 to 10, in particular from 0.5 to 5, % by weight in the case of lubricant compositions, based in each case on the total amount of the composition. The fuel and lubricant compositions usually contain the stated further components and assistants usual for this purpose, in addition to the novel compounds I as carrier oils, detergents or dispersants.

Combinations of gasoline fuel with a mixture of the polyalkene alcohol polyetheramines I, conventional synthetic carrier oils based on alkoxylated long-chain alcohols or phenols and/or polyisobuteneamine detergents, in particular those of the abovementioned groups a), b), c) or d), and corrosion inhibitors and/or lubricity additives based on carboxylic acids or fatty acids, which may be present as monomeric and/or dimeric species, are furthermore particularly suitable for the novel fuel compositions.

The novel polyalkene alcohol polyetheramines I have an excellent effect as gasoline fuel detergents for cleaning valves and keeping them clean. In addition, they do not have the disadvantages, described above, of the polyisobuteneamine and polyetheramine detergents disclosed in the prior art. Furthermore, they are sufficiently compatible with the other additives so that no separation effects occur in the fuel and lubricant additive concentrates. Moreover, their viscosity behavior does not give rise to any formulation problems.

EXAMPLES

Preparation of an Adduct of Propylene Oxide with Polyisobutene Alcohol ($M_N$=550) and Subsequent Reductive Amination A polyisobutene alcohol prepared according to EP-A 277 345 from highly reactive polyisobutene by hydroformylation and having a number-average molecular weight $M_N$ of 550 was reacted with 25 mol of propylene oxide (PO) under conventional reaction conditions (potassium hydroxide catalysis, 135° C. reaction temperature).

260 g of liquid ammonia were added to 300 g of the resulting adduct in an autoclave and heating was carried out at a hydrogen pressure of 200 bar in the presence of a catalyst containing nickel oxide, copper oxide, zirconium oxide and molybdenum oxide (prepared according to Example 1–10 of EP-A 696 572) at 210° C. for 10 hours.

Testing of Performance Characteristics

In a Mercedes Benz M 102 E engine, the cleanness of the intake valves was tested with the prepared polyisobutene alcohol polyetheramine according to CEC-method F-05-A-93. A commercial European premium-grade fuel according to EN 228, which contained the above polyisobutene alcohol polyetheramine as a detergent in a dose of 400 mg/kg of gasoline fuel, was used for this purpose.

The table below shows the test results:

|  | Intake valve deposits [mg/valve] | | | | |
| --- | --- | --- | --- | --- | --- |
|  | 1 | 2 | 3 | 4 | Mean value |
| without additive | 448 | 517 | 614 | 632 | 553 |
| with additive | 2 | 42 | 14 | 38 | 24 |

What is claimed is:

1. A polyalkene alcohol polyetheramine of the formula I

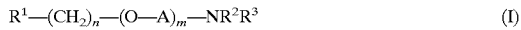

$$R^1\text{—}(CH_2)_n\text{—}(O\text{—}A)_m\text{—}NR^2R^3 \quad (I)$$

where $R^1$ is a polybutyl or polyisobutyl radical derived from isobutene and up to 20% by weight of n-butene and having a number average molecular weight of from 300 to 2500, $R^2$ and $R^3$ may be identical or different and are hydrogen, aliphatic or aromatic hydrocarbon radicals, primary or secondary, aromatic or aliphatic aminoalkylene radicals or polyaminoalkylene radicals, polyoxyalkylene radicals, heteroaryl or heterocyclyl radicals or, together with the nitrogen atom to which they are bonded, form a ring in which further heteroatoms may be present, the maximum number of carbon atoms in $R^2$ and $R^3$ together being 400, A is 1,2-propylene and/or 1,2-butylene, m is from 10 to 45 and n is 0 or 1.

2. A polyalkene alcohol polyetheramine I as claimed in claim 1, in which $R^1$ is a polybutyl or polyisobutyl radical having a number average molecular weight of from 400 to 850.

3. A polyalkene alcohol polyetheramine I as claimed in claim 1 in which $R^2$ is hydrogen and $R^3$ is likewise hydrogen or an alkyl radical having a total of 2 to 8 carbon atoms which furthermore contain from 1 to 4 primary, secondary and/or tertiary nitrogen atoms.

4. A polyalkene alcohol polyetheramine I as claimed in claim 1, which is derived from a polyalkene alcohol polyalkoxylate of the formula II

$$R^1\text{—}(CH_2)_n\text{—}(O\text{—}A)_m\text{—}OH \quad (II)$$

where $R^1$, A, m and n have the abovementioned meanings, with the proviso that the oxygen in oxyalkylate radical —A—(O—A)$_{m-1}$—OH accounts for at least 16.5% by weight of the number average molecular weight of the total molecule of the compounds II.

5. A polyalkene alcohol polyetheramine I as claimed in claim 1, in which the molar mass of oxyalkylate radical —A—(O—A)$_{m-1}$—OH in the polyalkene alcohol polyalkoxylate II is from 1.5 to 5 times the molar mass of the parent polyalkene alcohol R—(CH$_2$)$_n$—OH.

6. A process for preparing polyalkene alcohol polyetheramines of the formula I as claimed in claim 1, wherein polyalkylene alcohol polyalkoxylates of the formula II

$$R^1\text{—}(CH_2)_n\text{—}(O\text{—}A)_m\text{—}OH \quad (II)$$

where $R^1$, A, m and n have the abovementioned meanings, are subjected to reductive amination with ammonia, monoamines or polyamines using hydrogenation or amination catalysts usual for this purpose.

7. A carrier oil, detergent or dispersant in fuel and lubricant compositions comprising the polyalkene alcohol polyether amine I as claimed in claim 1.

8. A fuel or lubricant additive concentrate containing a polyalkene alcohol polyetheramine I as claimed in claim 1 in an amount of from 0.1 to 80% by weight.

9. A fuel or lubricant composition containing the polyalkene alcohol polyetheramine I as claimed in claim 1.

* * * * *